United States Patent
Asakura et al.

(10) Patent No.: US 8,052,101 B2
(45) Date of Patent: Nov. 8, 2011

(54) ROTATING TABLE FOR DISPLAY DEVICE

(75) Inventors: Naoki Asakura, Tokyo (JP); Katsutoshi Okada, Tokyo (JP); Yoshiki Nagaoka, Tokyo (JP); Norio Yamashita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 144 days.

(21) Appl. No.: 12/425,794

(22) Filed: Apr. 17, 2009

(65) Prior Publication Data

US 2009/0272870 A1 Nov. 5, 2009

(30) Foreign Application Priority Data

May 2, 2008 (JP) .................................. 2008-120071

(51) Int. Cl.
*A47F 5/00* (2006.01)
(52) U.S. Cl. ..................... 248/124.1; 248/415; 248/921; 361/679.07; 361/679.21
(58) Field of Classification Search ............... 248/122.1, 248/124.1, 415, 125.7, 917, 919–923, 521, 248/522; 361/679.07, 679.06, 679.21
See application file for complete search history.

(56) References Cited

U.S. PATENT DOCUMENTS

| | | | | |
|---|---|---|---|---|
| 5,749,556 A | * | 5/1998 | Matsuoka et al. | 248/349.1 |
| 6,655,645 B1 | * | 12/2003 | Lu et al. | 248/176.1 |
| 7,669,287 B2 | * | 3/2010 | Lee et al. | 16/340 |
| 7,677,517 B2 | * | 3/2010 | Suzuki | 248/349.1 |
| 7,854,422 B2 | * | 12/2010 | Kameoka et al. | 248/349.1 |
| 2006/0171105 A1 | * | 8/2006 | Hsiao | 361/681 |
| 2007/0007401 A1 | * | 1/2007 | Corporation et al. | 248/125.7 |
| 2007/0210223 A1 | * | 9/2007 | Lee et al. | 248/178.1 |
| 2008/0100997 A1 | * | 5/2008 | Chen | 361/681 |
| 2010/0061041 A1 | * | 3/2010 | Chen | 361/679.01 |
| 2010/0193647 A1 | * | 8/2010 | Huang et al. | 248/124.1 |

FOREIGN PATENT DOCUMENTS

| | | |
|---|---|---|
| JP | 2004-258055 A | 9/2004 |
| KR | 100800074 B1 | 1/2008 |

OTHER PUBLICATIONS

Korean Office Action for Application No. 2009-0038147, dated Aug. 31, 2010 (with partial translation).

* cited by examiner

*Primary Examiner* — Terrell McKinnon
*Assistant Examiner* — Bradley Duckworth
(74) *Attorney, Agent, or Firm* — Birch, Stewart, Kolasch & Birch, LLP

(57) ABSTRACT

The invention provides a rotating table for a display device which can rotate around the horizontal shaft by a manual operation in addition to a small motor drive. A rotating table for a display device includes a rotating member arranged so as to be rotatable around a horizontal shaft, and in which the display device is arranged, a balancing device balancing with a gravity moment around the horizontal shaft in the display device, and a first motor-driven rotating mechanism rotating the rotating member around the horizontal shaft, and the first motor-driven rotating mechanism includes gear trains converting a rotation of an electric motor into a rotation of the rotating member, and a rotation allowing device allowing a rotation of the gear trains only in a case of a rotation having a torque not less than a predetermined torque with respect to the rotation from the rotating member side.

17 Claims, 13 Drawing Sheets

F I G . 8
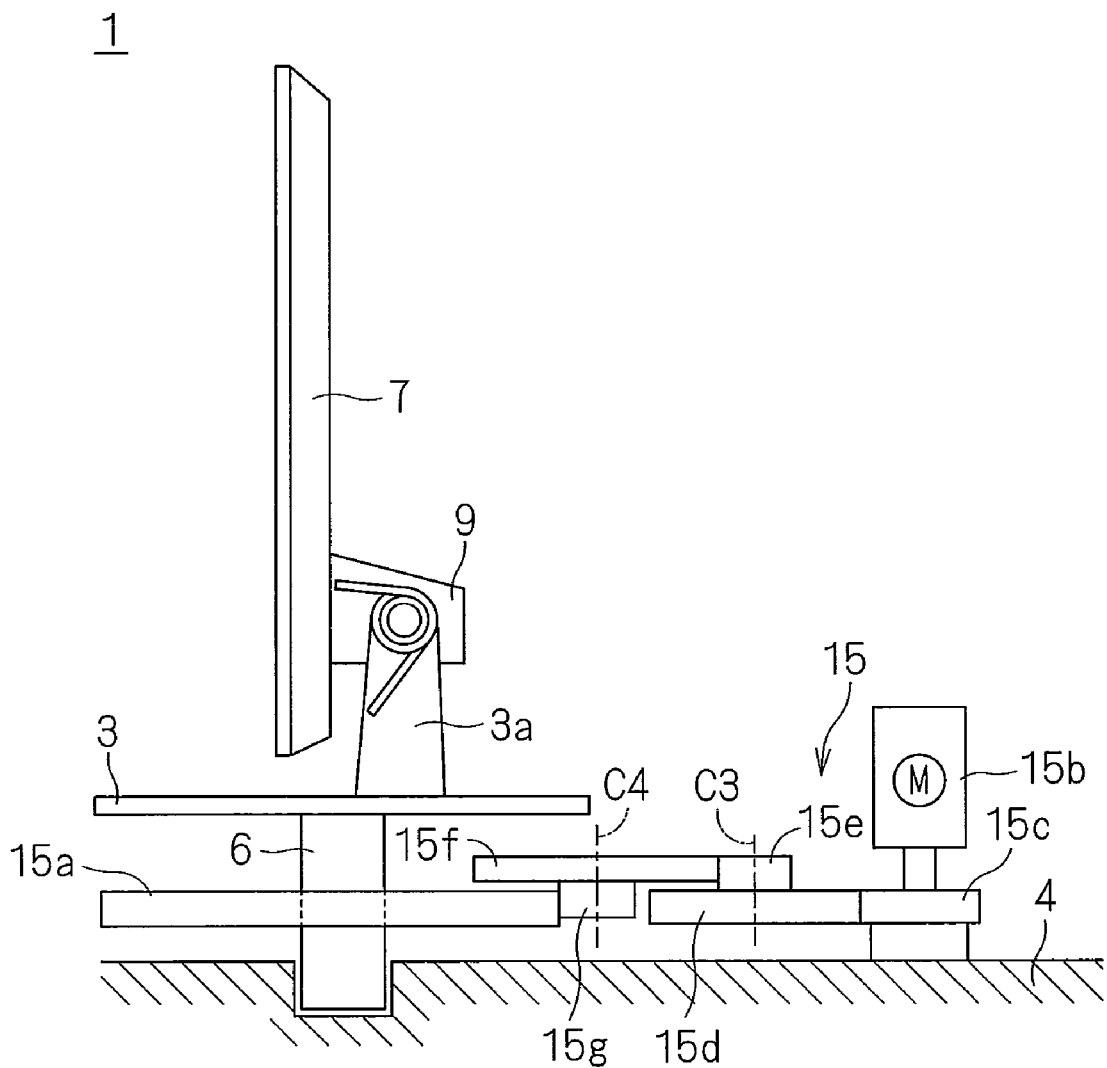

F I G . 1 3
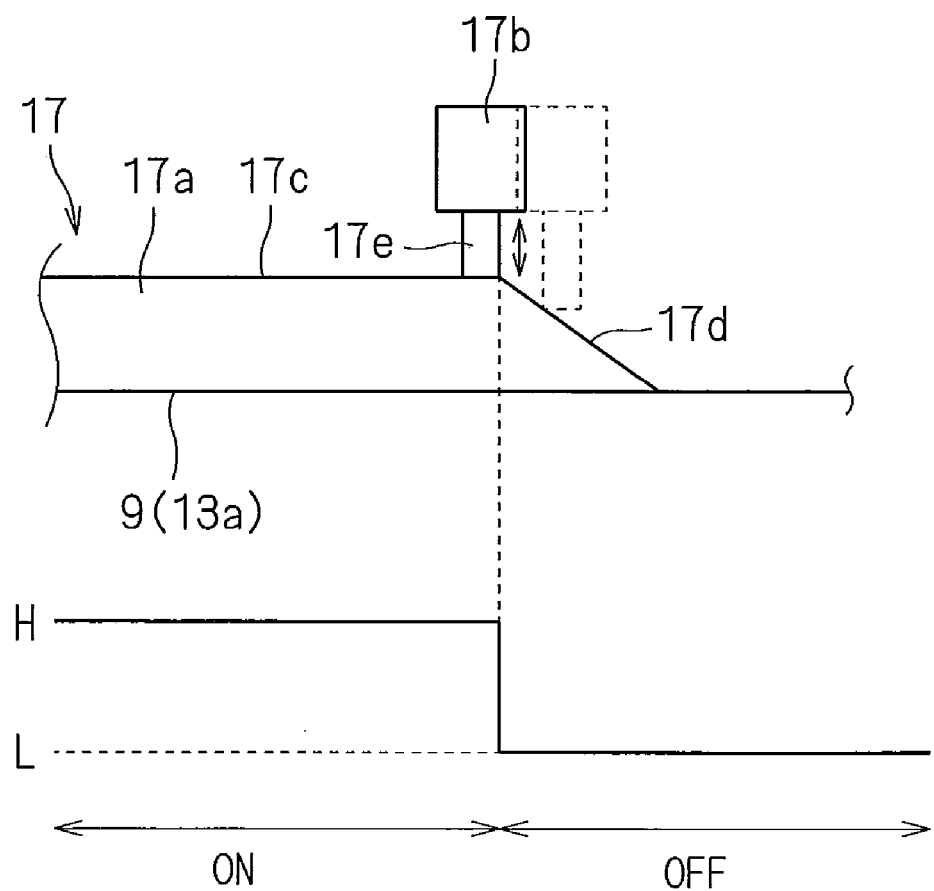

F I G . 1 4
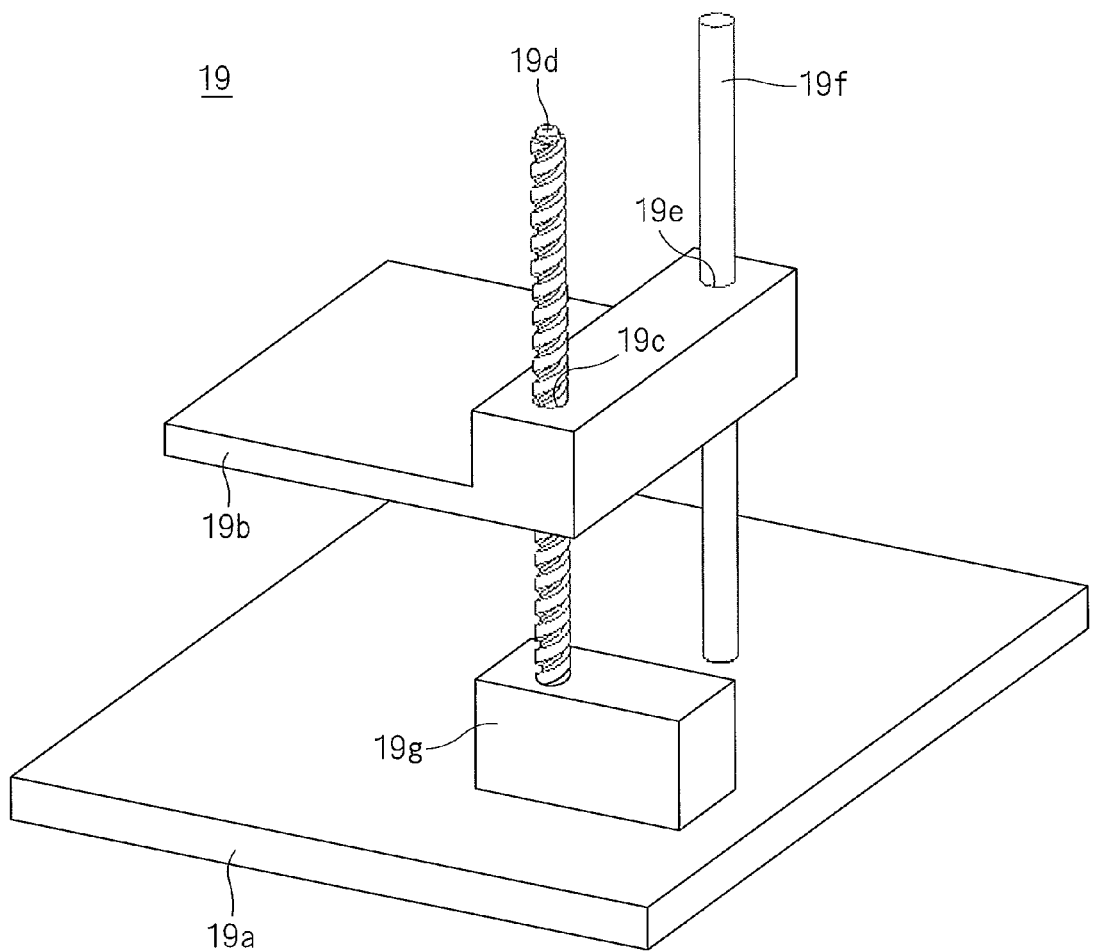

ROTATING TABLE FOR DISPLAY DEVICE

BACKGROUND OF THE INVENTION

1. Field of the Invention

The present invention relates to a rotating table for a display device adjusting a direction of the display device such as a liquid crystal device or the like with a motor drive.

2. Description of the Background Art

A conventional rotating table for a display device includes a table portion, a horizontal shaft arranged in a rising portion on the table portion, a rotating member rotatably arranged around the horizontal shaft, a display device arranged in the rotating member, and a motor-driven rotating mechanism rotating the rotating member around the horizontal shaft. With this configuration, the direction around the horizontal shaft of the display device is electrically adjusted.

As a prior art publication relating to the rotating table for the display device as mentioned above, there has been known the publication relating to Japanese Patent Application Laid-Open No. 2004-258055.

In the conventional rotating table for the display device, the direction of the display device is adjusted with the motor drive as mentioned above, however, for example, in a case that a user is near the display device, there is a case that it does not take a lot of trouble to manually adjust the direction of the display device than to electrically adjust the same. However, in the conventional rotating table for the display device, there is a problem that it is impossible to accept the rotation from the rotating member side because of an existence of the motor-driven rotating mechanism (that is, because of a structural factor of a gear mechanism within the motor-driven rotating mechanism and a standstill force of an electric motor), and it is hard to manually rotate the rotating member (accordingly, the display device).

Further, in order to rotate the display device around the horizontal shaft, since a considerable rotating force is necessary even if the display device is of a thin type, an electric motor having a high output is necessary. Accordingly, there is a problem of a higher cost, an enlargement in size, and higher electric power consumption.

SUMMARY OF THE INVENTION

An object of the invention is to provide a rotating table for a display device which can rotate around a horizontal shaft with a small motor drive force, and can rotate around the horizontal shaft by a manual operation in addition to the motor drive.

A first aspect of the present invention includes a first table portion, a horizontal shaft arranged in a rising portion of the first table portion, a rotating member arranged so as to be rotatable around the horizontal shaft, and in which a display device is arranged, a balancing device balancing with a gravity moment around the horizontal shaft in the display device, and a first motor-driven rotating mechanism rotating the rotating member around the horizontal shaft, the first motor-driven rotating mechanism includes a gear train converting a rotation of an electric motor into a rotation of the rotating member, and a rotation allowing device allowing a rotation of the gear train with respect to a rotation having a torque not less than a predetermined torque from the rotating member side.

In accordance with the first aspect of the present invention, since the first motor-driven rotating mechanism includes the rotation allowing device allowing the rotation of the gear train with respect to the rotation having the predetermined torque from the rotating member side, it is possible to rotate the rotating member (accordingly, the display device) around the horizontal shaft by the manual operation in addition to the motor drive. Further, since it is possible to balance with the gravity moment around the horizontal shaft of the display device by the balancing device, it is possible to rotate -the rotating member around the horizontal shaft with the small motor drive force.

These and other objects, features, aspects and advantages of the present invention will become more apparent from the following detailed description of the present invention when taken in conjunction with the accompanying drawings.

BRIEF DESCRIPTION OF THE DRAWINGS

FIG. 8 is an example view of a schematic view of a structure of a second motor-driven rotating mechanism 15 of the rotating table 1 for the display device in accordance with the first embodiment.

FIG. 13 is an example view of a schematic view of a structure of a neutral position detecting device 17 of a rotating table 1F for a display device in accordance with a sixth embodiment.

FIG. 14 is an example view of a schematic view of a structure of a motor-driven elevating mechanism 19 of a rotating table 1G for a display device in accordance with a seventh embodiment.

DESCRIPTION OF THE PREFERRED EMBODIMENTS

First Embodiment

Figure 1:
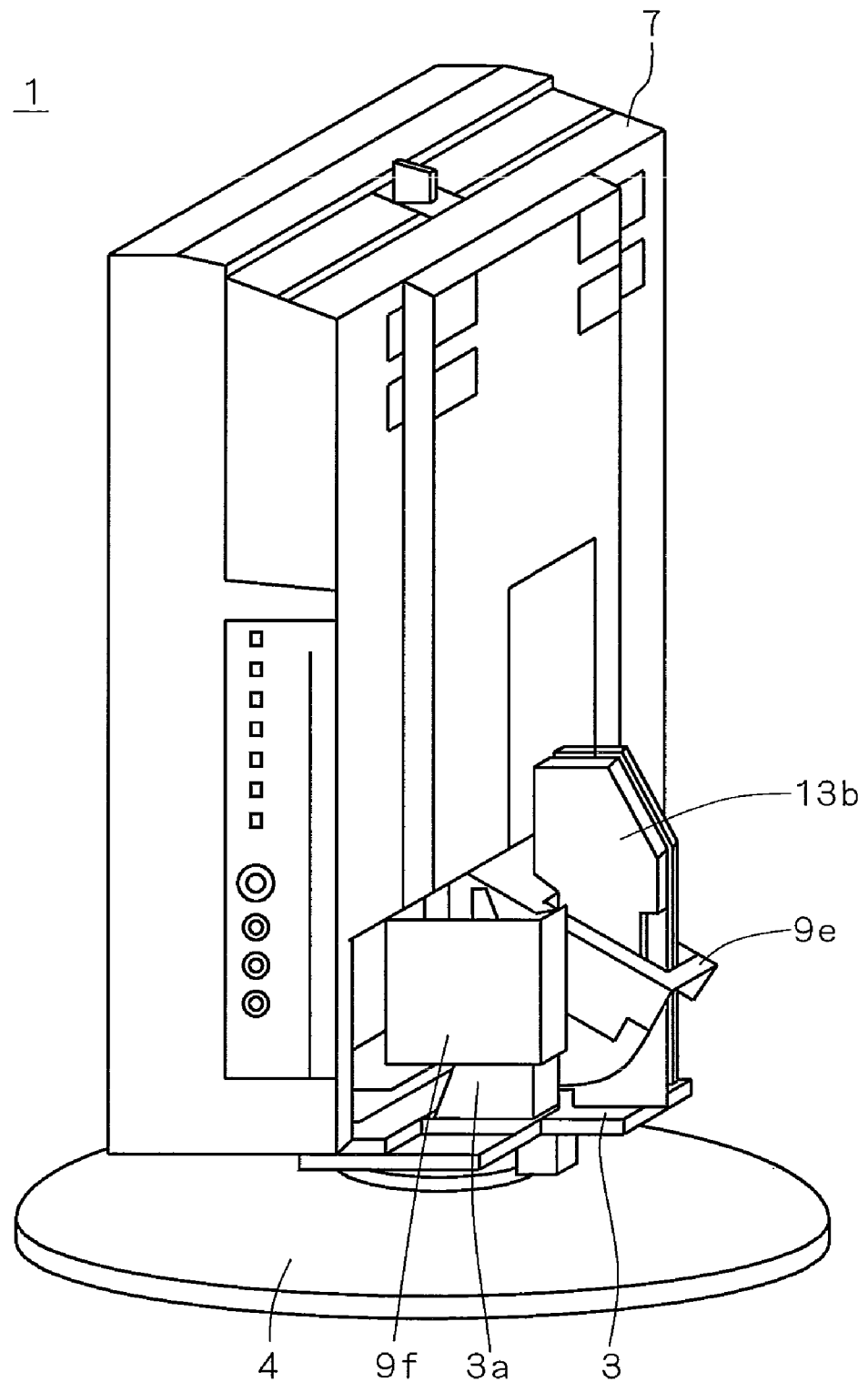
FIG. 1 is a general view in a case of attaching a display device 7 of a rotating table 1 for the display device in accordance with a first embodiment.

A rotating table 1 for a display device in accordance with a first embodiment is structured such as to rotate a direction of a display device around a horizontal shaft and a vertical shaft by means of a motor drive. The rotating table 1 for the display device includes, for example, a first table portion 3 formed in a plate shape, a second table portion 4 supporting the first table portion 3 so as to be rotatable around the vertical shaft, a horizontal shaft 5 arranged in a rising portion 3a of the first table portion 3, a rotating member 9 arranged so as to be rotatable around the horizontal shaft 5 and in which a display device 7 is arranged, a balancing device 11 balancing with a gravity moment around the horizontal shaft 5 in the display device 7, a first motor-driven rotating mechanism 13 rotating the rotating member 9 around the horizontal shaft 5, and a motor-driven rotating mechanism 15 (FIG. 8) rotating the first table portion 3 around a vertical shaft 6, as shown in FIGS. 1 to 8.

Figure 3:
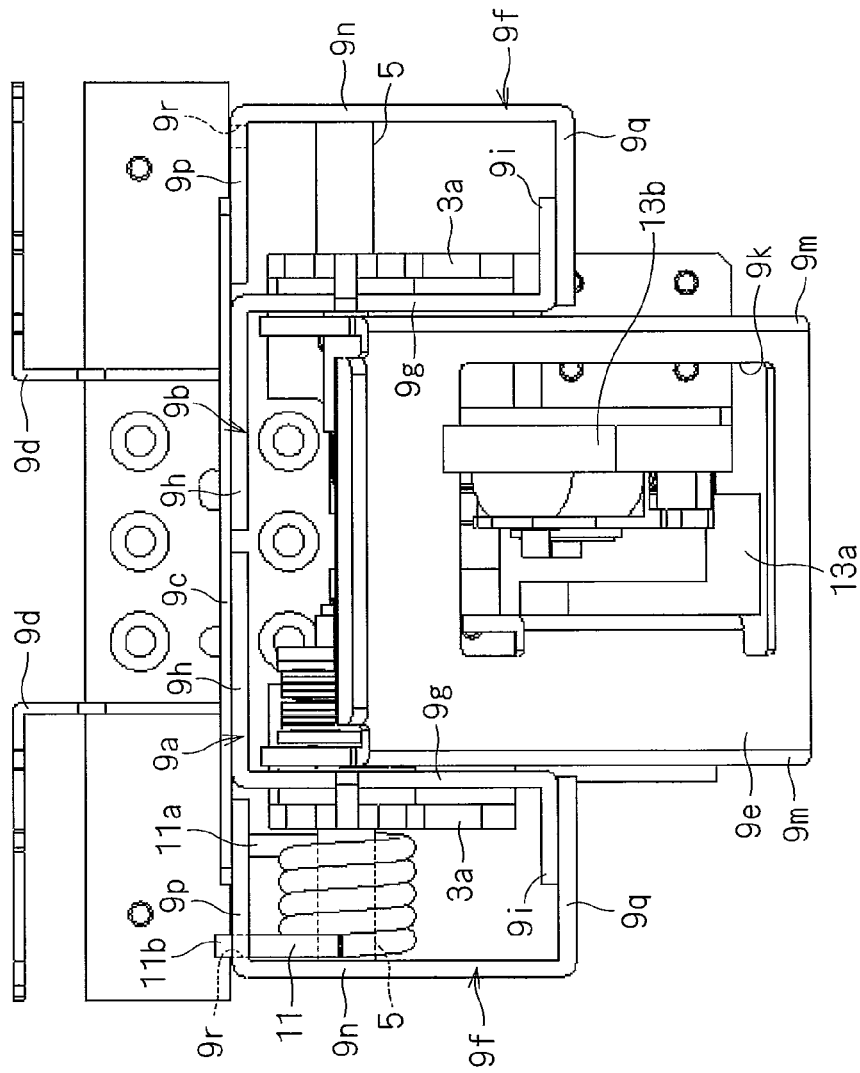
FIG. 3 is a plan view of the rotating table 1 for the display device in accordance with the first embodiment.

A pair of right and left rising portions 3a are provided in a rising manner on the first table portion 3, for example, as shown in FIG. 3. The horizontal shaft 5 is rotatably arranged in each of the rising portions 3a (in this case, each of the horizontal shafts 5 are arranged so as to be rotatably inserted to a hole portion formed in the rising portion 3a).

The rotating member 9 includes rotating member main bodies 9a and 9b arranged in the horizontal shafts 5, a coupling portion 9c coupling the rotating member main bodies 9a and 9b, an attaching portion 9d arranged in the coupling portion 9c and to which the display device 7 is attached, a fixing portion 9e arranged in the rotating member main bodies 9a and 9b and to which a circular arc-shaped internal gear 13a mentioned below is fixed, and a cover portion 9f for preventing the balancing device 11 from slipping off.

Figure 4:
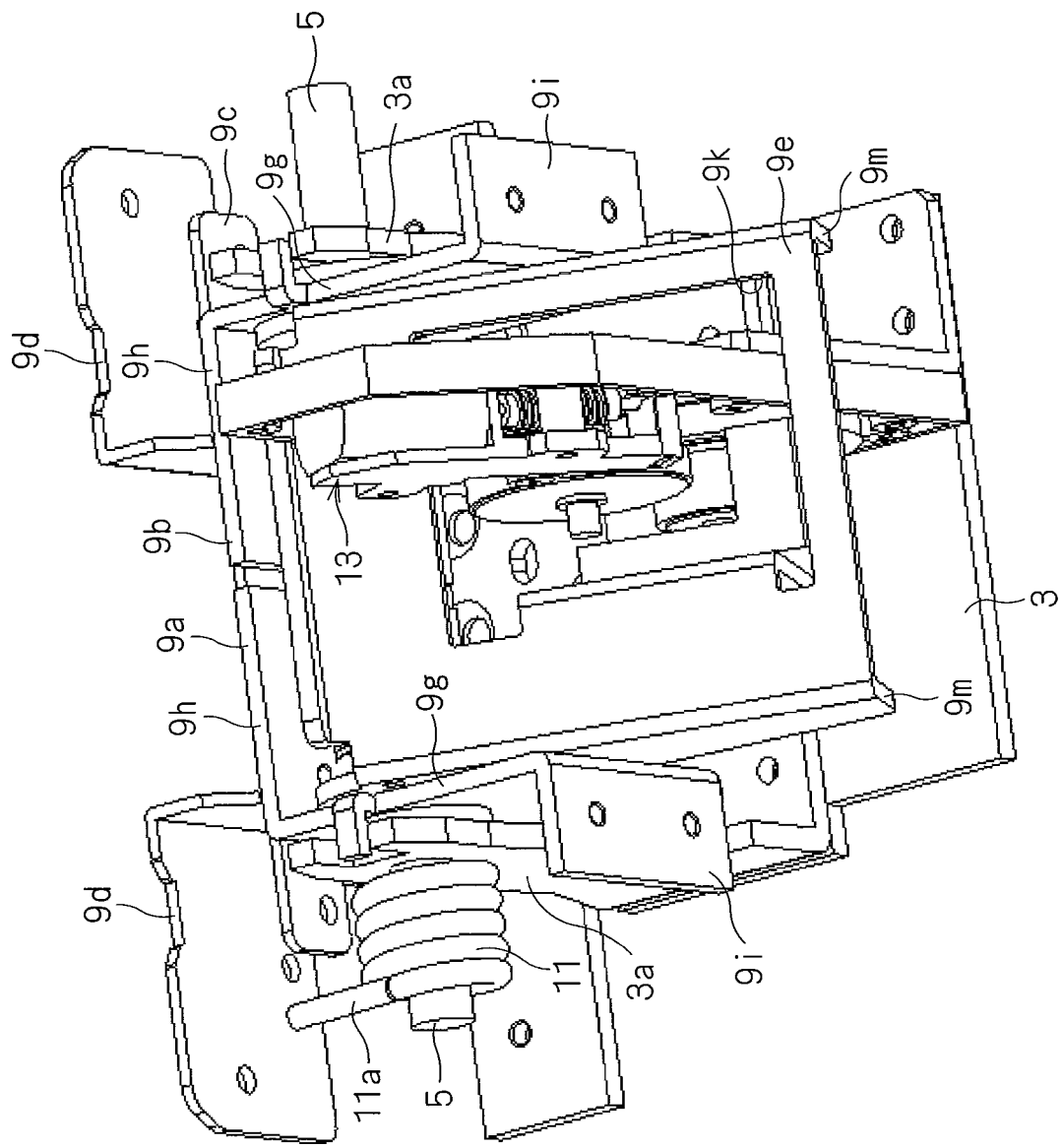
FIG. 4 is a perspective view in a case that a cover portion 9f is not provided in the rotating table 1 for the display device in accordance with the first embodiment.

Each of the rotating member main bodies 9a and 9b has a rectangular vertical plate portion 9g, and is formed such that a front edge portion 9h thereof is bent to its inner main surface side, and a rear edge portion 9i is bent to its outer main surface side, as shown in FIGS. 3 and 4. The horizontal shaft 5 is fixed to the vertical plate portion 9g. More specifically, a male screw (hereinafter, referred to as a male screw portion) is formed on an outer periphery of one end portion of the horizontal shaft 5, and the vertical plate portion 9g is fastened from both sides by two nuts engaged with the male portion in a state in which the male screw portion is inserted to the hole portion of the vertical plate portion 9g. In this manner, the horizontal shaft 5 is fixed to the vertical plate portion 9g. The coupling portion 9c is coupled to the front edge portion 9h by a bolt or the like, and the cover portion 9f is coupled to the rear edge portion 9i by a bolt or the like.

The fixing portion 9e has a flat plate portion 9j, and is structured such that an opening portion 9k is formed in a center thereof, and both side edge portions 9m thereof are bent to a lower surface side, as shown in FIGS. 3 and 4. A hole portion is formed in the edge portion 9m, and the edge portion 9m is fastened together with the vertical plate portions 9g of the rotating member main bodies 9a and 9b from both sides by the two nuts engaged with the male screw portion in a state in which the male screw portion of the horizontal shaft 5 is inserted to the hole portion. In this manner, the fixing portion 9e is arranged in the rotating member main bodies 9a and 9b.

Figure 2:
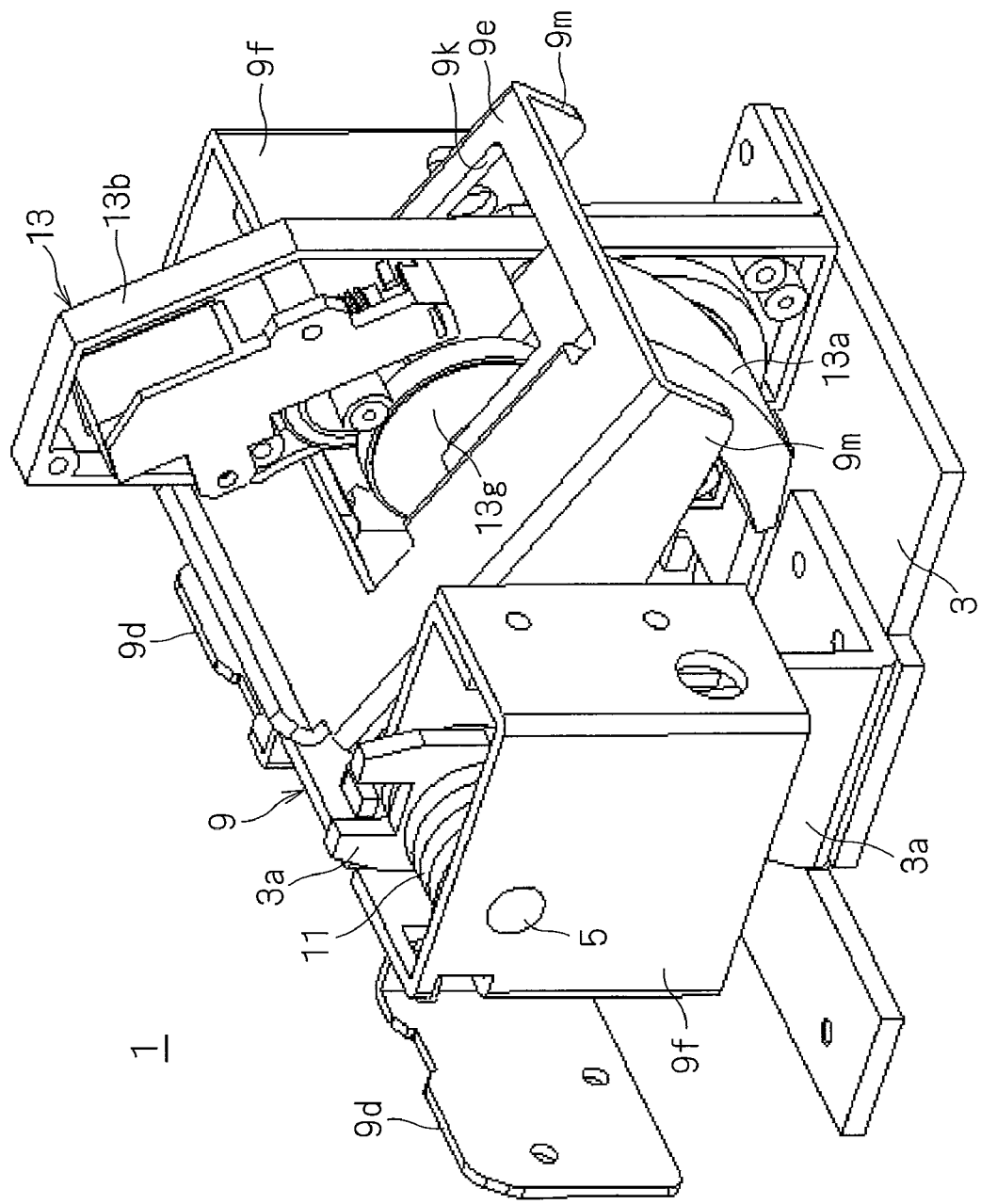
FIG. 2 is a perspective view of the rotating table 1 for the display device in accordance with the first embodiment.

The cover portion 9f is arranged in each of the rotating member main bodies 9a and 9b, as shown in FIGS. 2 and 3. Each of the cover portions 9f has a vertical plate portion 9n, for example, formed in a rectangular shape, and a front edge portion 9p and a rear edge portion 9q thereof are bent to an inner main surface side. The front edge portion 9p is coupled to the coupling portion 9c of the rotating member main body 9a or 9b by a bolt or the like, and the rear edge portion 9q is coupled to the rear edge portion 9i of the rotating member main body 9a or 9b by a bolt or the like. In this manner, the cover portion 9f is arranged in the rotating member main bodies 9a and 9b.

Figure 5:
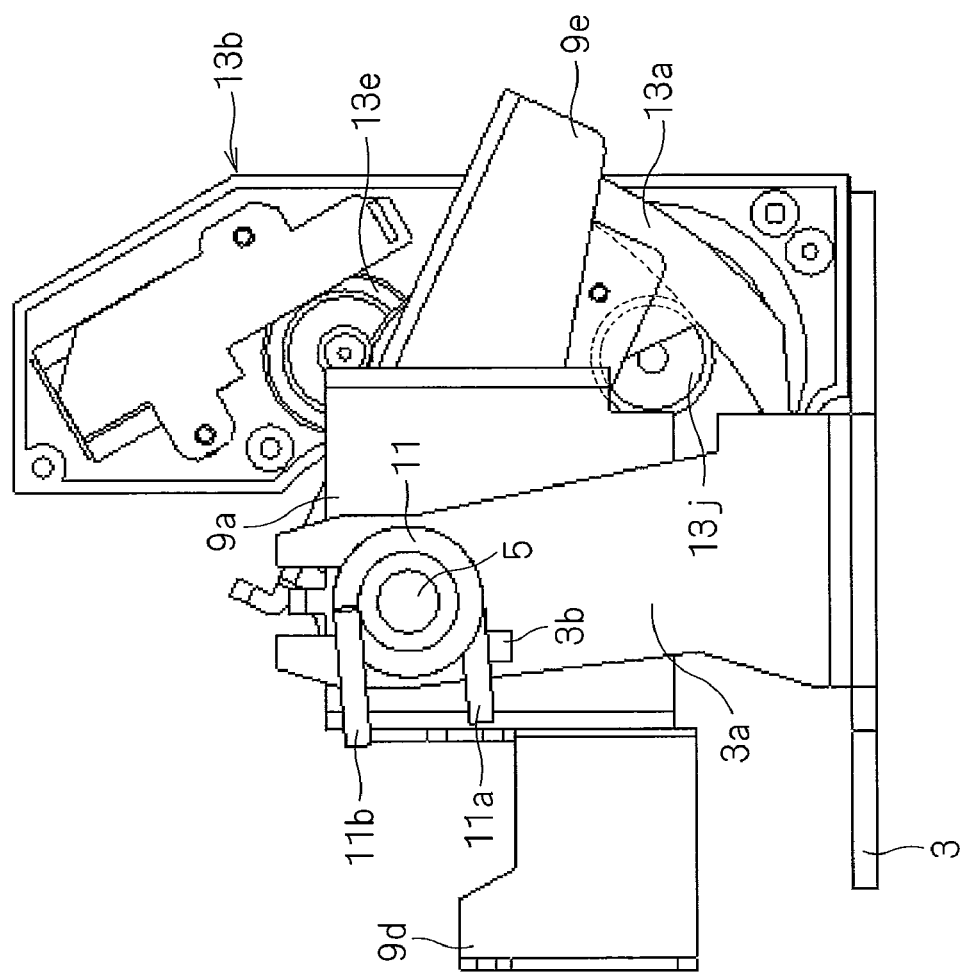
FIG. 5 is a side view in the case that the cover portion 9f is not provided in the rotating table 1 for the display device in accordance with the first embodiment.

The balancing device 11 is constituted, for example, by a torsion coil spring, and is structured, for example, as shown in FIGS. 3 and 5, such that one end portion 11a is locked to a locking portion 3b arranged in a side surface of the rising portion 3a, and the other end portion 11b is locked to a locking hole 9r of the rotating member 9 (more specifically, the cover portion 9f), in such a manner as to energize the rotating member 9 upward in a state of being wound around the horizontal shaft 5. In this case, the balancing device 11 is arranged on only one horizontal shaft 5 as a matter of convenience for drawing, in FIGS. 3 and 4, however, is arranged in both horizontal shafts 5.

The first motor-driven rotating mechanism 13 includes a circular arc-shaped internal gear 13a arranged in the rotating member 9, and a gear box 13b arranged in the first table portion 3, as shown in FIG. 5.

The circular arc-shaped internal gear 13a is arranged in the fixing portion 9e of the rotating member 9 in such a manner that the circular arc is concentric with the horizontal shaft 5.

Figure 6:
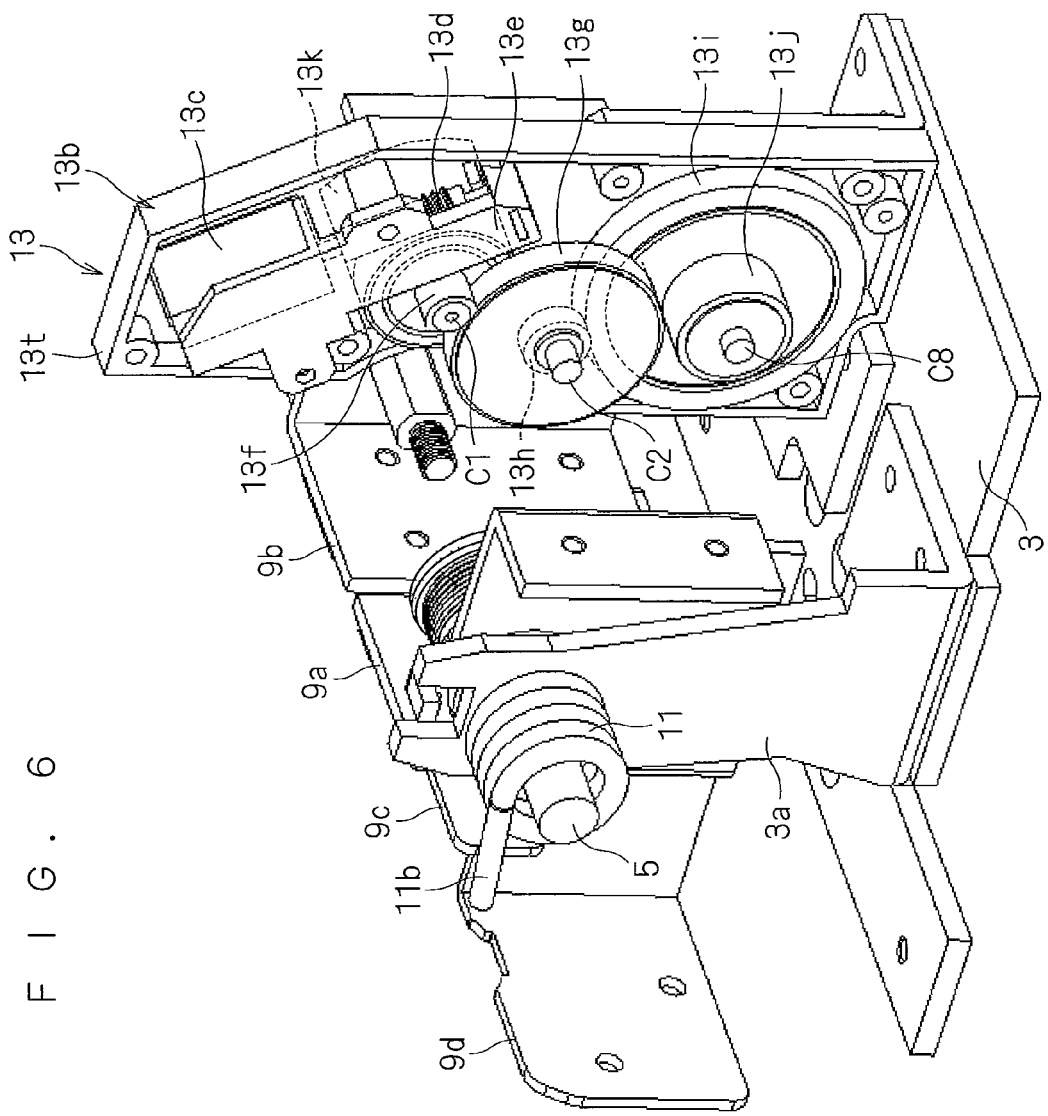
FIG. 6 is a view illustrating a gear box 13b of the rotating table 1 for the display device in accordance with the first embodiment.

The gear box 13b is arranged on the first table portion 3 in such a 5 manner as to be arranged within the opening portion 9k of the fixing portion 9e of the rotating member 9, as shown in FIG. 2. The gear box 13b includes an electric motor 13c, a worm gear 13d, a worm wheel 13e, first to fourth relay gears 13f and 13i, a drive gear 13j and a slip mechanism 13k, as shown in FIG. 6.

The worm gear 13d is arranged in the rotating shaft of the electric motor 13c. The worm wheel 13e and the first relay gear 13f are arranged so as to be rotatable around a rotating axis C1 in a state of being coupled via the slip mechanism 13k. The second relay gear 13g and the third relay gear 13h are arranged so as to be rotatable around a rotating axis C2 in a state of being coupled to each other. The fourth relay gear 13i and the drive gear 13j are arranged so as to be rotatable around a rotating axis C8 in a state of being coupled to each other.

The worm gear 13d is engaged with the worm wheel 13e, the first relay gear 13f is engaged with the second relay gear 13g, the third relay gear 13h is engaged with the fourth relay gear 13i, and the drive gear 13j is engaged with the circular arc-shaped internal gear 13a.

Figure 7:
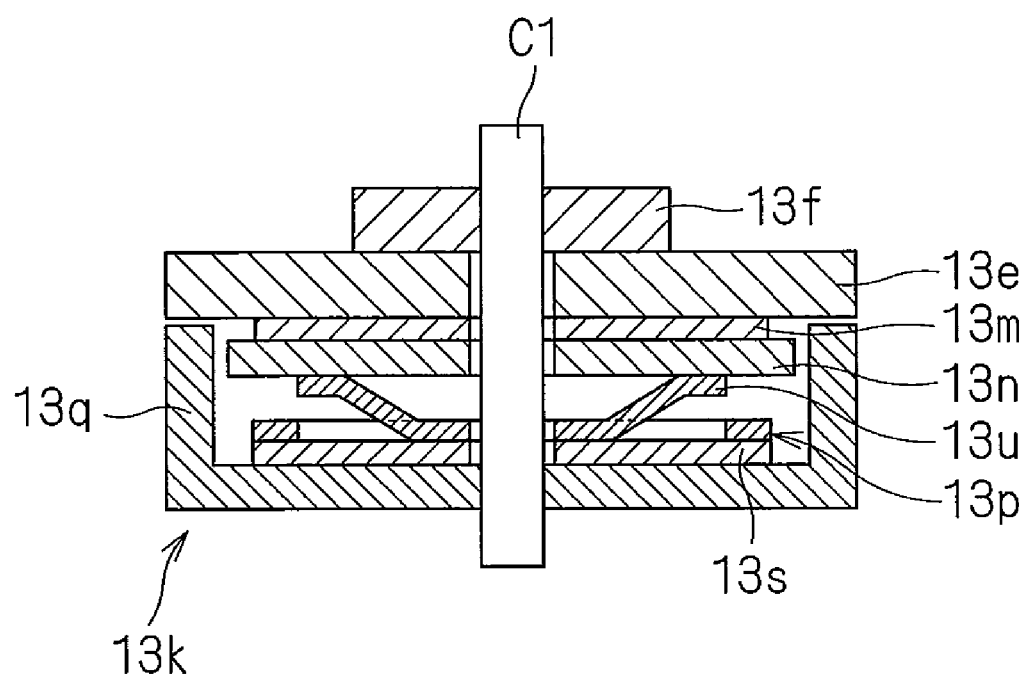
FIG. 7 is an example view of a cross sectional view of a slip mechanism 13k of the rotating table 1 for the display device in accordance with the first embodiment.

The slip mechanism 13k includes first and second friction plates 13m and 13s, a contact plate 13n, a pressure spring 13p, and a case portion 13q, for example, as shown in FIG. 7. In this case, the rotating axis C1 is arranged rotatably in a casing 13t of the gear box 13b, is inserted rotatably to the worm wheel 13e, and is inserted fixedly to the first relay gear 13f.

The first and second friction plates 13m and 13s are formed, for example, in a disc shape. The first friction plate 13m is rotatably inserted by the rotating axis C1, and is arranged in a back face side of the worm wheel 13e. The second friction plate 13s is rotatably inserted by the rotating axis C1, and is arranged in a back face side of the pressure spring 13p.

The contact plate 13n is formed, for example, in a disc shape. The contact plate 13n is rotatably inserted by the rotating shaft C1, and is arranged in a back face side of the first friction plate 13m.

The pressure spring 13p is formed by cutting a spring piece 13u so as to rise diagonally, for example, in a disc-shaped metal thin plate, although its kind is not particularly limited. The pressure spring 13p is rotatably inserted by the rotating axis C1, and is arranged in a back face side of the first friction plate 13m.

The case portion 13q is formed, for example, in a top face opened box shape in a plan circular shape. The case portion 13q is structured such that the rotating axis C1 is fixedly inserted to its bottom portion in such a manner that each of the constructing elements 13m, 13n and 13p is accommodated therein.

In this slip mechanism 13k, the contact plate 13m and the first friction plate 13n are pressed to the worm wheel 13e with a spring force of the pressure spring 13p, the second friction plate 13s is pressed to the case portion 13q, and the worm wheel 13e is fixed by the rotating axis C1 with the spring force of the pressure spring 13p and a friction force between the constructing elements 13m, 13n, 13p, 13q and 13s.

Accordingly, the worm wheel 13e is fixed to the rotating axis C1 so as to rotate (that is, rotates while being coupled to the first relay gear 13f via the rotating axis C1) if the worm wheel 13e is rotated at a torque less than a predetermined torque. On the other hand, the worm wheel 13e runs idle with respect to the rotating axis C1 (that is, runs idle with respect to the first relay gear 13f), if it is rotated at a torque not less than the predetermined torque.

With this configuration, in this first motor-driven rotating mechanism 13, the worm gear 13d, the worm wheel 13e, the first to fourth relay gears 13f to 15i and the drive gear 13j are rotated in order by driving the electric motor 13c. The drive gear 13j rolls on the circular arc-shaped internal gear 13a in accordance with this rotating motion, the circular arc-shaped internal gear 13a is rotated around the horizontal shaft 5 in accordance with this rolling motion, and the rotating member 9 (accordingly, the display device 7) is rotated around the horizontal shaft 5 in accordance with this rotating motion.

Further, in a stop state of the electric motor 13c, an angle of rotation of the worm wheel 13e is fixed by the worm gear 13d (accordingly, angles of rotation of the other gears 13f to 13j are fixed), and an angle of rotation of the rotating member 9 (accordingly, the display device 7) around the horizontal shaft 5 is fixed. As mentioned above, the worm gear 13d serves as a rotation angle fixing device fixing the angles of rotation of the gear trains 13e to 13j at a time when the electric motor 13c stops.

Further, in a stop state of the electric motor 13c, if the torque not less than the predetermined torque is manually applied to the rotating member 9 or the display device 7 around the horizontal shaft 5, the torque is transmitted to the drive gear 13j and the fourth to first relay gears 13i to 13f in order, and the torque not less than the predetermined torque is applied to the first relay gear 13f. Thereby the first relay gear 13f runs idle with respect to the worm wheel 13e by the slip mechanism 13k, and the rotating member 9 (accordingly the display device 7) rotates around the rotating member 9 manually. As mentioned above, the slip mechanism 13k serves as a rotation allowing device allowing the rotation of the gear trains 13f to 13i only in a case of the rotation having a torque not less than the predetermined torque with respect to the rotation from the rotating member 9 side.

The second table portion 4 rotatably supports the vertical shaft 6 arranged in the lower surface of the first table portion 3 as shown in FIG. 8.

The second motor-driven rotating mechanism 15 includes a final stage gear 15a which is arranged in the lower surface of the first table portion 3 so as to be concentric with the vertical shaft 6, an electric motor 15b in which a rotating shaft is vertically arranged, a first stage gear 15c arranged in the rotating shaft of the electric motor 15b, and first to fourth relay gears 15d to 15g which transmit the rotation of the first stage gear 15c to the final stage gear 15a, as shown in FIG. 8. In this case, an illustration of an exterior case portion of the second table portion 4 is not given in FIG. 8, however, the second motor-driven rotating mechanism 15 is actually accommodated inside the second table portion 4.

The first and second relay gears 15d and 15e are arranged so as to be rotatable around a vertical rotating axis C3 in a state in which they are coupled to each other. The third and fourth relay gears 15f and 15g are arranged so as to be rotatable around a vertical rotating axis C4 in a state in which they are coupled to each other. The first stage gear 15c is engaged with the first relay gear 15d, the second relay gear 15e is engaged with the third relay gear 15f, and the fourth relay gear 15g is engaged with the final stage gear 15a.

With this configuration, in the second motor-driven rotating mechanism 15, the first stage gear 15c, the first to fourth relay gears 15d to 15g and the final stage gear 15a are rotated in order by driving the electric motor 15b, and the first table portion 3 (accordingly the display device 7) is rotated around the vertical shaft 6 in accordance with this rotation.

In accordance with the rotating table 1 for the display device configured as mentioned above, since the first motor-driven rotating mechanism 13 is provided with the rotation allowing device (the slip mechanism) 13f allowing the rotation of the gear trains 13f to 13j only in the case of the rotation having a torque not less than the predetermined torque with respect to the rotation from the rotating member 9 side, it is possible to rotate the rotating member 9 (accordingly the display device 7) around the horizontal shaft 5 also by a manual operation in addition to the motor drive.

In this case, since the rotation allowing device 13f is configured by the slip mechanism fixing the first relay gear (the second gear) 13f to the worm wheel (the first gear) 13e with respect to the rotation having a torque less than the predetermined torque from the rotating member 9 side, and making the first relay gear 13f run idle against the worm wheel 13e with respect to the rotation having a toque not less than the predetermined torque from the rotating member 9 side, it is possible to construct by a simple mechanism.

Further, since the slip mechanism 13f is arranged in a pair of gears 13e and 13f which exist closest to the first stage side within the gear trains 13e to 13j of the gear box 13b and are arranged coaxially with each other, it is possible to make a slip torque of the slip mechanism 13f smaller than a rotating torque of the rotating member 9 corresponding to the final stage side, whereby it is possible to make the spring force and the friction force which are necessary in the slip mechanism 13f small, and it is possible to downsize the slip mechanism 13f.

Further, since it is possible to balance with the gravity moment around the horizontal shaft 5 in the display device 7 by the balancing device (the torsion coil spring) 11, it is possible to rotate the rotating member 9 (accordingly the display device 7) around the horizontal shaft 5 by a small motor drive force.

In this case, since the balancing device 11 is a torsion coil spring, it is possible to construct by a simple mechanism.

Further, since the first motor-driven rotating mechanism 13 is provided with the rotation fixing device (the worm gear) 13d fixing the angles of rotation of the gear trains 13e to 13j at a time when the electric motor 3c stops, it is possible to maintain the angle of rotation of the rotating member 9 (accordingly the display device 7) at a time when the electric motor 13c stops.

Here, since the rotation fixing device 13d is constituted by the worm gear arranged in the rotating shaft of the electric motor 3c, it is possible to construct by a simple mechanism.

Further, since the first motor-driven rotating mechanism 13 includes the circular arc-shaped gear 13a arranged in the rotating member 9, and the gear box 13b arranged in the first table portion 3, and the gear box 13b includes the electric motor 13c, and the gear trains 13d to 13j in which the final stage gear 13j is engaged with the circular arc-shaped internal gear 13a, it is possible to construct by a simple structure. Particularly, it is possible to downsize the gear box 13b by using the circular arc-shaped internal gear 13a. In this case, the gear box 13b may be arranged in the rotating member 9, and the circular arc-shaped internal gear 13a may be arranged in the first table portion 3.

Further, since the second table portion 4 supporting the first table portion 3 so as to be rotatable around the vertical shaft 6, and the second motor-driven rotating mechanism 15 rotating the first table portion 3 around the vertical shaft 6 are further provided, it is possible to rotate the display device 7 by the motor drive also around the vertical shaft 6 in addition to the horizontal shaft 5.

Further, since the second motor-driven rotating mechanism 15 is configured by the final stage gear 15a arranged in the first table portion 3 so as to be concentric with the vertical shaft 6, the electric motor 15b, and the gear trains 15c to 15f transmitting the rotation of the electric motor 15b to the final stage gear 15a, it is possible to construct by a simple structure.

It should be noted, in this embodiment, that the configuration may be further made such that the rotating member 9 or the display device 7 can be rotated around the vertical shaft 6 manually, for example, by coupling the relay gears 15e and 15d to each other via the rotation allowing device having the same configuration as the rotation allowing device 13k.

Second Embodiment

A rotating table 1B for a display device in accordance with a second embodiment is structured such that the spring force of the balancing device 11 is automatically released when the rotating table 1 for the display device is further lifted up, in the first embodiment.

Figure 12:
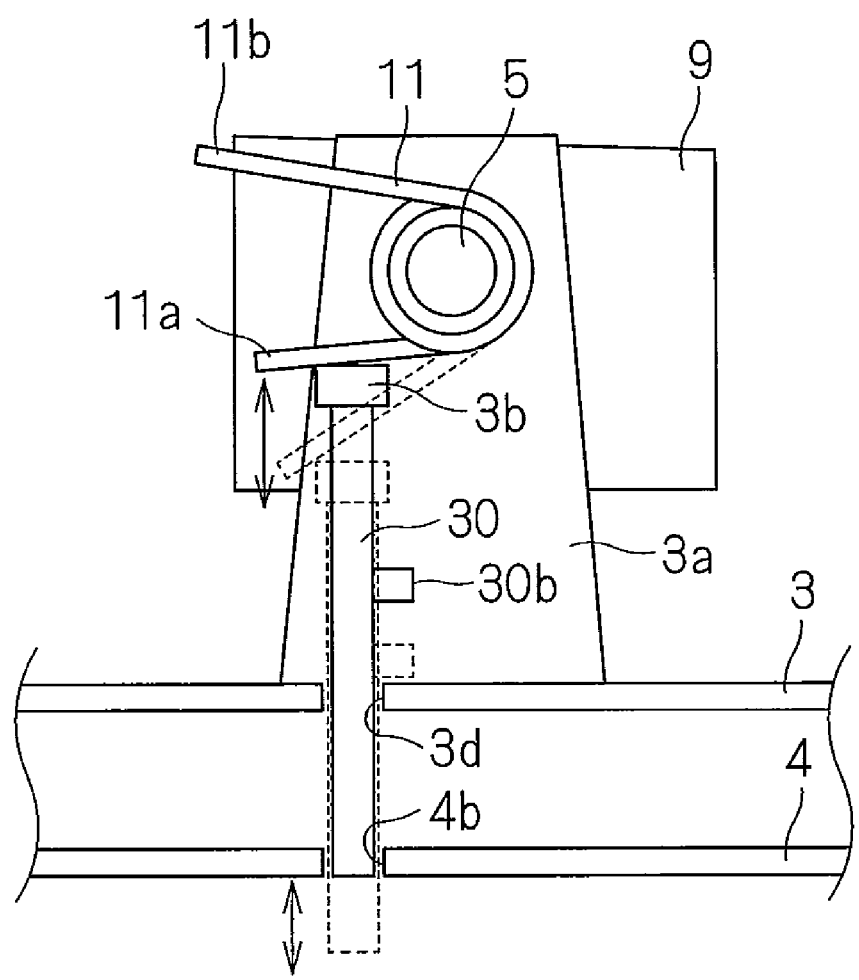
FIG. 12 is an example view of a schematic view of a spring force releasing device 30 of a rotating table 1B for a display device in accordance with a second embodiment.

In this embodiment, as shown in FIG. 12, a spring force releasing device 30 is arranged in the first table portion 3 in such a manner as to freely protrude and retreat from a lowest surface (a bottom surface of the second table portion 4 in this case) of the rotating table 1B for the display device. Further, in this embodiment, the locking portion 3b is not arranged in the side surface of the rising portion 3a of the first table portion 3, but is coupled to the spring force releasing device 30, thereby being arranged in the first table portion 3 so as to be movable up and down.

The spring force releasing device 30 is formed, for example, in a vertical rod shape, is arranged in the first table portion 3 so as to be movable up and down along the side surface of the rising portion 3a of the first table portion 3, and is structured such that the locking portion 3b is coupled to an upper end thereof, and a lower end thereof freely protrudes and retreats from the lower surface of the second table portion 4. A projection portion 30b for preventing from slipping off downward is formed in an outer peripheral surface of the spring force releasing device 30. In this case, insertion holes 3d and 4b to which the spring force releasing device 30 is inserted are formed in the first and second table portions 3 and 4.

With this configuration, the spring force releasing device 30 is pushed into the lower surface of the second table portion 4 by the ground in an installed state of the rotating table 1B for the display device, thereby raising the locking portion 3b so as to push up one end 11a of the balancing device (the torsion coil spring) 11 and accumulate the spring force in the balancing device 11. On the other hand, in a lifted state of the rotating table 1B for the display device, the spring force releasing device 30 protrudes from the lower surface of the second table portion 4 with its own weight, thereby letting down the locking portion 3b so as to release the one end 11a of the balancing device 11 downward and release the spring force of the balancing device 11. In this case, in the lifted state of the rotating table 1B for the display device, the projection portion 30b of the spring force releasing device 30 is locked, for example, to the top face of the first table portion 3 so as to prevent from slipping off downward.

In accordance with the rotating table 1B for the display device configured as mentioned above, it is possible to easily attach the balancing device 11 to the rotating member 9. In other words, the balancing device 11 has been conventionally attached to the rotating member 9 by applying a great preload to the balancing device 11, however, since the balancing device 11 can be attached to the rotating member 9 by utilizing the weight of the rotating table 1B for the display device, it is possible to easily attach the balancing device 11 without necessity of any great preload.

Third Embodiment

Figure 9:
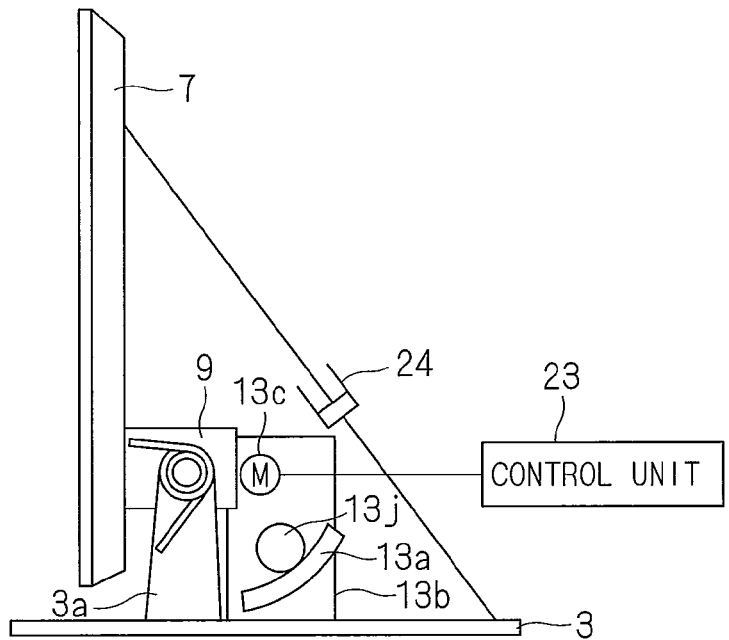
FIG. 9 is an example view of a schematic view of a structure of a rotating table 1C for a display device in accordance with a third embodiment.

A rotating table 1C for a display device in accordance with a third embodiment further includes a control unit 23 controlling the electric motor 13c of the first motor-driven rotating mechanism 13 in such a manner as to slowly decelerate a rotating speed at a time when the rotation of the rotating member 9 around the horizontal shaft 5 stops, and a damper device 24 for slowly decelerating the rotating speed at a time when the rotation of the rotating member 9 around the horizontal shaft 5 stops between the rotating member 9 or the display device 7 and the first table portion 3, in the first embodiment, as shown in FIG. 9.

Figure 10:
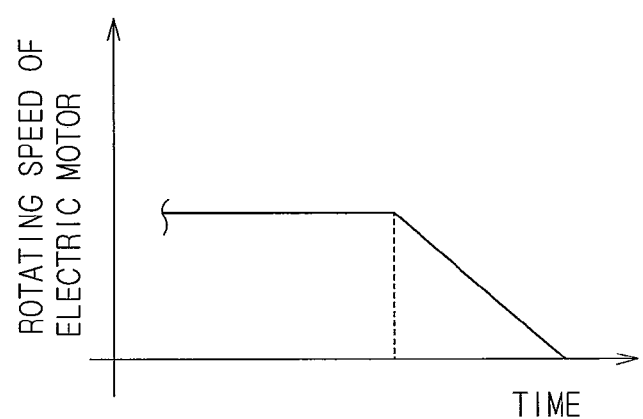
FIG. 10 is an example view of an output voltage to an electric motor by a control unit 23 of the rotating table 1C for the display device in accordance with the third embodiment.

The control unit 23 controls the rotation of the electric motor 13c to a fixed speed during the rotation of the rotating member 9 around the horizontal shaft 5, and controls the rotating speed of the electric motor 13c so as to slowly decelerate, at a time when the rotating member 9 stops, as shown in FIG. 10. In this case, a decelerating method of the rotation of the electric motor 13c may be achieved by slowly reducing an applied voltage to the electric motor 13c, or slowly reducing a duty ratio in a case of a PWM drive.

The damper device 24 is constituted, for example, by an air damper or an oil damper, and is arranged between a back face of the display device 7 and the first table portion 3 in FIG. 9.

In accordance with the rotating table 1C for the display device structured as mentioned above, since the first motor-driven rotating mechanism 13 is controlled in such a manner as to slowly decelerate the rotating speed at a time when the rotation of the rotating member 9 around the horizontal shaft 5 stops, it is possible to prevent a vibration at a time when the rotation of the rotating member 9 stops, and it is possible to improve a motion quality at a time when the rotation stops.

Further, since the damper device 24 for slowly decelerating the rotating speed at a time when the rotation of the rotating member 9 around the horizontal shaft 5 stops is provided between the display device 7 or the rotating member 9 and the first table portion 3, it is possible to prevent the vibration at a time when the rotation of the rotating member 9 stops, and it is possible to improve the motion quality at a time when the rotation stops.

Fourth Embodiment

In a fourth embodiment, a description will be given of a modified embodiment of the first motor-driven rotating mechanism 13 in accordance with the first embodiment.

Figure 11:
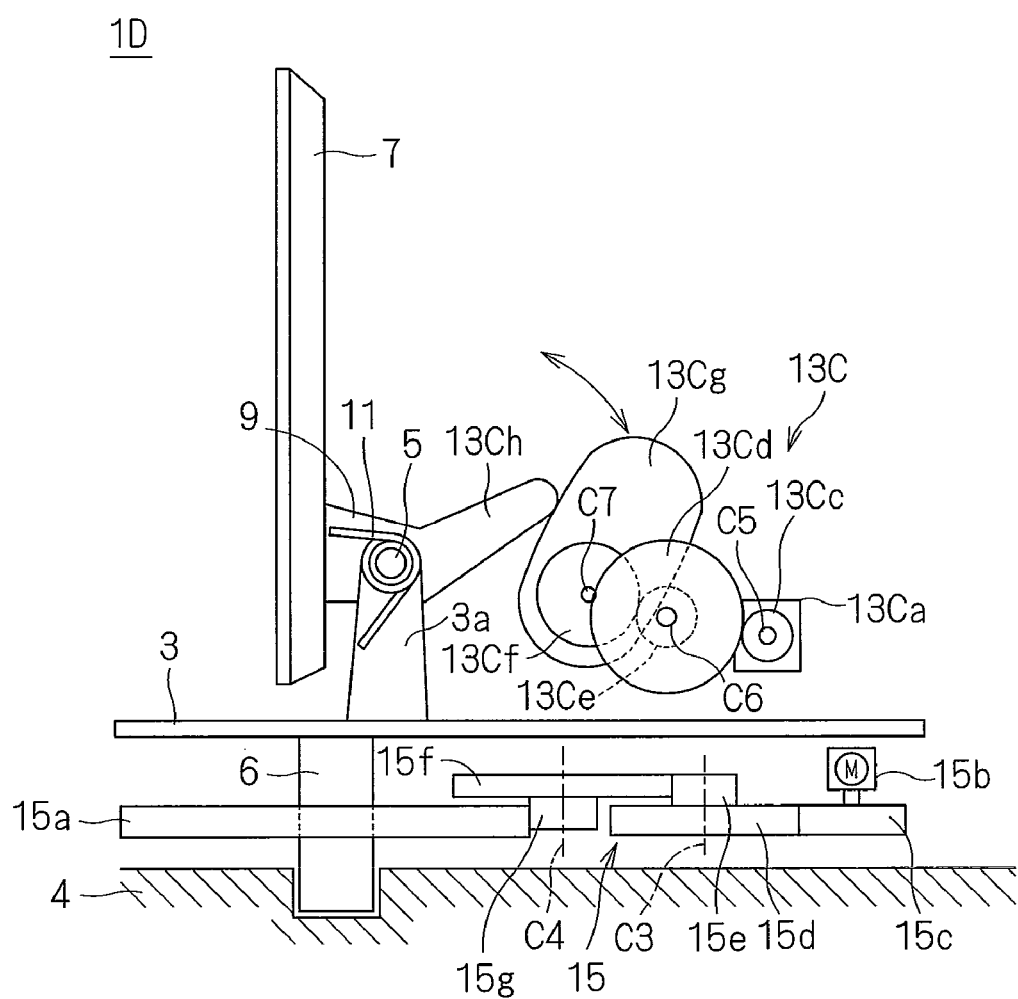
FIG. 11 is an example view of a schematic view of a structure of a rotating table 1D for a display device in accordance with a fourth embodiment.

A first motor-driven rotating mechanism 13C in accordance with this embodiment is arranged on the first table portion 3, and includes a driven node 13Ch arranged in the rotating member 9 (more specifically, the back face of the front edge portion 9h of the rotating member main bodies 9a and 9b), an oval disc-shaped cam 13Cg, an electric motor 13Ca in which the rotating shaft C5 is horizontally arranged, a first stage gear 13Cc arranged in a rotating axis C5 of the electric motor 13Ca, and first to third relay gears 13Cd to 13Cf transmitting a rotation of the first stage gear 13Cc to the cam 13Cg, as shown in FIG. 11.

The driven node 13Ch is formed, for example, in a rod shape, and is arranged in the rotating member 9 (more specifically, the back face of the front edge portion 9h of the rotating member main bodies 9a and 9b) in such a manner as to protrude, for example, upward to a rear side of the rotating member 9. A driven roller which is rotatable around the horizontal shaft is arranged in a leading end portion of the driven node 13Ch, although an illustration is not given.

The first relay gear 13Cd and the second relay gear 13Ce are arranged so as to be rotatable around the horizontal shaft C6, in a state in which they are coupled via a rotation allowing device (not shown) having the same structure as the rotation allowing device (the slip mechanism) 13k in accordance with the first embodiment. The third relay gear 13Cf and the cam 13Cg are arranged so as to be rotatable around a horizontal axis C7 in a state in which they are coupled to each other.

The first stage gear 13Cc is engaged with the first relay gear 13Cd, the second relay gear 13Ce is engaged with the third relay gear 13Cf, and the cam 13Cg is engaged with the driven roller of the driven node 13Ch.

With this configuration, in the first motor-driven rotating mechanism 13C, if the electric motor 13Ca rotates in one direction, the rotation is transmitted to each of the gears 13Cc to 13Cf and the cam 13Cg is rotated, whereby the driven node 13Ch arranged in the rotating member 9 is driven with the rotation of the cam 13Cg, and the rotating member 9 is rotated back and forth periodically around the horizontal shaft 5. The rotating member 9 may be rotated back and forth periodically around the horizontal shaft 5 by rotating the electric motor 13Ca only in one direction, or the rotating member 9 may be rotated back and forth around the horizontal shaft 5 by forward or reverse rotating the electric motor 13Ca.

Further, in this embodiment, if the rotating member 9 or the display device 7 are rotated rearward around the horizontal shaft 5 manually by applying a torque not less than a predetermined torque, by means of the rotation allowing device (for example, the slip mechanism) arranged in the first relay gear 13Cd and the second relay gear 13Ce, in the same manner as the first embodiment, each of the gears 13Cd and 13Ce runs idle, and the rotating member 9 or the display device 7 is rotated rearward around the horizontal shaft 5.

In this case, in this embodiment, the rotating member 9 is energized rearward around the horizontal shaft 5 by the balancing device 11, and the driven node 13Ch and the cam 13Cg are engaged all the time by the energization.

It is possible to obtain an effect similar to the first embodiment by a rotating table 1D for a display device structured as mentioned above.

Further, since the first motor-driven rotating mechanism 13C is configured by the electric motor 13Ca, the driven node 13Ch arranged in the rotating member 9, the cam 13Cg engaging with the driven node 13Ch and arranged so as to be rotatable around the horizontal shaft C7, and the gear trains 13Cc to 13Cf transmitting the rotation of the electric motor 13Ca to the cam 13C, it is possible to achieve by a simple structure.

Fifth Embodiment

A rotating table 1E for a display device in accordance with a fifth embodiment is structured such as to be further provided with an angle sensor, for example, arranged in the first table portion 3 and detecting an inclination (an angle to the vertical direction) of the first table portion 3, and a control unit (not shown) controlling the first electric rotating mechanism 13 or 13C in response to a result of detection of the angle sensor so as to limit a rotating range of the rotating member 9, in the first to fourth embodiments.

The control unit limits a movable range of the rotation of the rotating member 9 around the horizontal shaft 5 by the first electric rotating mechanism 13 or 13C, for preventing the rotating table 1E for the display device from toppling, in response to the result of detection of the angle sensor (that is, the inclination of the first table portion 3). For example, the control unit limits a critical angle of the forward (backward) rotation of the rotating member 9 around the horizontal shaft 5 smaller, in accordance with an increase of the forward (backward) inclination of the first table portion 3. Accordingly, it is possible to prevent toppling when the rotating member 9 is rotated by the inclination of the first table portion 3.

Sixth Embodiment

A sixth embodiment is structured such as to further include a neutral position detecting device 17 detecting a neutral position of the rotation of the rotating member 9 around the horizontal shaft 5, in the first to fifth embodiments.

The neutral position detecting device 17 includes a pressing convex portion 17a, for example, arranged in a side surface of the rotating member 9 or a side surface of the circular arc-shaped internal gear 13a, and a self-return type push button switch 17b arranged in the first table portion 3 and switched so as to be turned on and off by a pressing operation of a tope end surface 17c of the pressing convex portion 17a, as shown in FIG. 13.

The pressing convex portion 17a is formed in a protruding manner in a circular arc shape which is concentric with the horizontal shaft 5 in the side surface of the rotating member 9 (or the side surface of the circular arc-shaped internal gear 13a), and one end side thereof is formed as an inclined surface 17d height of which becomes gradually lower.

The pressing convex portion 17a rotates forward and backward in accordance with the forward and backward rotation of the rotating member 9 around the horizontal shaft 5. Further, with this rotation, a push button portion 17e goes up an inclined surface 17d of the pressing convex portion 17a and is pressed by an upper end surface 17c, whereby the push button switch 17b is turned on, and the push button portion 17e goes down the inclined surface 17d of the pressing convex portion 17a and the pressure from the upper end surface 17c is canceled, whereby the push button switch 17b is turned off.

In this case, in a state in which the rotating member 9 rotates forward around the horizontal shaft 5 (that is, in a state in which the display device 7 rotates forward), the push button switch 17b is, for example, turned on, and in a state in which the rotating member 9 rotates backward around the horizontal shaft 5, the push button switch 17b is, for example, turned off.

In other words, the neutral position of the rotation of the rotating member 9 around the horizontal shaft 5 is detected by the switching on and off of the push button switch 17b, the forward rotating state of the rotating member 9 around the horizontal shaft 5 is detected by the on state of the push button switch 17b, and the backward rotating state of the rotating member 9 around the horizontal shaft 5 is detected by the off state of the push button switch 17b.

In accordance with the rotating table 1F for the display device structured as mentioned above, since the neutral position detecting device detecting the neutral position of the rotating member 9 around the horizontal shaft 5 is provided, it is possible to detect the neutral position of the rotation of the rotating member 9 around the horizontal shaft 5, and it is possible to return the rotating position of the rotating member 9 around the horizontal shaft 5 to the neutral position when the electric power supply is on or off, or at any time, by controlling the second electric rotating mechanism 15 by using the result of detection.

Further, since the neutral position detecting device 17 includes the pressing convex portion 17a arranged in the rotating member 9 so as to form the circular arc shape which is concentric with the horizontal shaft 5, and the self-return type push button switch 17b which is switched on and off with the pressing operation by the upper end surface 17c of the pressing convex portion 17a, it is possible to detect the forward rotating state or the rearward rotating state of the rotating member 9 from the neutral position, as well as the neutral position of the forward and backward rotations of the rotating member 9 (accordingly the display device 7) around the vertical shaft 5.

Seventh Embodiment

A seventh embodiment is structured such as to further include a motor-driven elevating mechanism 19 moving up and down the second table portion 4, in the first to fifth embodiments.

The motor-driven elevating mechanism 19 includes a base table (a third table portion) 19a, an elevating table 19b in which the base table 3 is arranged, a screw shaft 19d provided in a rising manner on the base table 19a so as to be rotatable around its center axis and screw inserted to a screw hole 19c of the elevating table 19b, a guide shaft 19f provided in a rising manner on the base table 19a and inserted to an insertion hole 19e of the elevating table 19b, and a motor-driven drive unit 19g arranged on the base table 19a and provided for rotating the screw shaft, for example, as shown in FIG. 14.

The elevating table 19b has an attaching surface 19h in which the second table portion 4 is attached to its upper surface, and has the screw hole 19c passing through the upper and lower surfaces, and the insertion hole 19e passing through the upper and lower surfaces. The screw hole 19c is structured such that a female screw is formed on an inner peripheral surface thereof, and is engaged with a male screw formed on an outer peripheral surface of the screw shaft 19d.

The elevating table 19b is fixed at a position in a horizontal direction by the screw shaft 19d and the guide shaft 19f, and is moved up or down along the screw shaft 19d and the guide shaft 19f by the rotation of the screw shaft 19d around its center axis.

With this configuration, if the screw shaft 19d is rotated in one direction by driving the motor-driven drive unit 19g, the elevating table 19b is moved up in accordance with the rotation of the screw shaft 19d, whereby the second table portion 4 attached to the elevating table 19b is moved up and the display device 7 is moved up. Further, if the screw shaft 19d is rotated in the reverse direction by driving the motor-driven drive unit 19g, the elevating table 19b is moved down in accordance with the rotation of the screw shaft 19d, whereby the second table portion 4 attached to the elevating table 19b is moved down and the display device 7 is moved down.

In accordance with the rotating table 1G for the display device structured as mentioned above, since the motor-driven elevating mechanism 19 moving up and down the base table (the second table portion) 3 is provided, it is possible to move the display device 7 up and down as well as rotating the display device 7 around horizontal shaft 5 and the horizontal shaft 6.

Further, since the motor-driven elevating mechanism 19 is configured by the base table 19a, the elevating table 19b, the screw shaft 19d and the guide shaft 19f, it is possible to construct by a simple mechanism.

While the invention has been shown and described in detail, the foregoing description is in all aspects illustrative and not restrictive. It is therefore understood that numerous modifications and variations can be devised without departing from the scope of the invention.

What is claimed is:

1. A rotating table for a display device comprising:
a first table portion;
a horizontal shaft arranged in a rising portion of said first table portion;
a rotating member arranged so as to be rotatable around said horizontal shaft, and in which a display device is arranged;
a balancing device balancing with a gravity moment around said horizontal shaft in said display device; and
a first motor-driven rotating mechanism rotating said rotating member around said horizontal shaft,
wherein said first motor-driven rotating mechanism includes:
a gear train converting a rotation of an electric motor into a rotation of said rotating member, the gear train including
a first gear rotating while working with the rotation of said electric motor; and
a second gear arranged in an identical rotating shaft as said first gear and rotating while working with the rotation of said rotating member; and
a rotation allowing device allowing a rotation of said gear train with respect to a rotation having a torque not less than a predetermined torque from said rotating member side,
wherein said rotation allowing device is configured by a slip mechanism fixing said second gear to said first gear with respect to a rotation having a torque less than a predetermined torque from said rotating member side, and making said second gear idle run against said first gear with respect to a rotation having a torque not less than the predetermined torque from said rotating member side.

2. The rotating table for the display device according to claim 1, wherein said first motor-driven rotating mechanism is further provided with a rotation angle fixing device fixing an angle of rotation of each of the gears in said gear train at a time when said electric motor stops.

3. The rotating table for the display device according claim 1, wherein said first and second gears are disposed adjacent to a first stage side in said gear train and are arranged coaxially with each other.

4. The rotating table for the display device according to claim 2, wherein said rotation angle fixing device is configured by a worm gear which is arranged in the rotating shaft of said electric motor, and engages with a worm wheel in said gear train.

5. The rotating table for the display device according to claim 1, wherein said balancing device is configured by a torsion coil spring in which one end portion is locked to a locking portion arranged in said first table portion and the other end portion is locked to said rotating member, in such a manner as to provide stored kinetic energy to assist in the upward movement of said rotating member, in a state of being wound around said horizontal shaft.

6. The rotating table for the display device according to claim 5, wherein said locking portion is arranged in said first table portion so as to be movable up and down,
wherein a spring force releasing device arranged in said first table portion so as to freely protrude and retreat from a lowest surface of said rotating table for the display device and coupled to said locking portion is further provided, and
wherein said spring force releasing device is pushed into the lowest surface of said rotating table for the display device, thereby raising said locking portion and accumulating a spring force in said balancing device, in an installed state of said rotating table for the display device, and protrudes from the lowest surface of said rotating table for the display device, thereby letting down said locking portion and releasing the spring force of said balancing device, in a lift-up state of said rotating table for the display device.

7. The rotating table for the display device according to claim 1, wherein said first motor-driven rotating mechanism comprises:
a circular arc-shaped internal gear arranged in one of said rotating member and said first table portion; and
a gear box arranged in the other of said rotating member and said first table portion,
wherein said gear box includes:
said electric motor; and
said gear train in which a final stage gear is engaged with said circular arc-shaped internal gear.

8. The rotating table for the display device according to claim 1, wherein said first motor-driven rotating mechanism comprises:
said electric motor;
a driven node arranged in said rotating member;
a cam engaging with said driven node and arranged so as to be rotatable around a horizontal shaft; and
said gear train transmitting the rotation of said electric motor to said cam.

9. The rotating table for the display device according to claim 1, further comprising:
a second table portion supporting said first table portion so as to be rotatable around a vertical shaft; and
a second motor-driven rotating mechanism rotating said first table portion around the vertical shaft.

10. The rotating table for the display device according to claim 9, wherein said second motor-driven rotating mechanism comprises:
an electric motor;
a final stage gear arranged so as to be concentric with said vertical shaft; and
a gear train transmitting the rotation of said electric motor to said final stage gear.

11. The rotating table for the display device according to claim 1, further comprising a control unit controlling said first motor-driven rotating mechanism in such a manner as to slowly decelerate a rotating speed at a time when the rotation of said rotating member around the horizontal shaft stops.

12. The rotating table for the display device according to claim 1, wherein a damper device for slowly decelerating a rotating speed at a time when the rotation of said rotating member around the horizontal shaft stops is further provided between said display device or said rotating member and said first table portion.

13. The rotating table for the display device according to claim 9, further comprising a motor-driven elevating mechanism moving up and down said second table portion.

14. The rotating table for the display device according to claim 13, wherein said motor-driven elevating mechanism comprises:
a third table portion;
an elevating table in which said second table portion is arranged;
a screw shaft provided in a rising manner on said third table portion so as to be rotatable around a center axis thereof and screw inserted to a screw hole passing through upper and lower surfaces of said elevating table;
a guide shaft provided in a rising manner on said third table portion and inserted to an insertion hole passing through the upper and lower surfaces of said elevating table; and
a motor-driven drive unit rotating said screw shaft around said center axis.

15. The rotating table for the display device according to claim 1, further comprising a neutral position detecting device detecting a neutral position of the rotation of said rotating member around the horizontal shaft.

16. The rotating table for the display device according to claim 15, wherein said neutral position detecting device comprises:
a pressing convex portion arranged in said rotating member so as to form a circular arc shape which is concentric with said horizontal shaft, and structured such that one end side thereof is formed as an inclined surface; and
a self-return type push button switch arranged in said first table portion and switched on and off with a pressing motion by an upper end surface of said pressing convex portion,
said neutral position of said rotating member is detected by switching on and off said push button switch, a rotating state to one of a forward side and a backward side from said neutral position of said rotating member is detected by an on state of said push button switch, and a rotating state to the other of the forward side and the backward side from said neutral position of said rotating member is detected by an off state of said push button switch.

17. The rotating table for the display device according to claim 1, further comprising:
an angle sensor detecting an inclination of said first table portion with respect to a vertical direction; and
a control unit controlling said first motor-driven rotating mechanism in response to a result of detection of said angle sensor so as to limit a rotating range of said rotating member.

* * * * *